(12) United States Patent
Bialer et al.

(10) Patent No.: US 12,270,891 B2
(45) Date of Patent: Apr. 8, 2025

(54) HIGH RESOLUTION RADAR SIMULATION TO TRAIN VEHICLE RADAR SYSTEM NEURAL NETWORK

(71) Applicant: GM Global Technology Operations LLC, Detroit, MI (US)

(72) Inventors: Oded Bialer, Petach Tikva (IL); Yuval Haitman, Oranit (IL); Dan Levi, Ganei Tikvah (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 297 days.

(21) Appl. No.: 17/947,298

(22) Filed: Sep. 19, 2022

(65) Prior Publication Data

US 2024/0094377 A1 Mar. 21, 2024

(51) Int. Cl.
| | | |
|---|---|---|
| G01S 13/58 | (2006.01) | |
| G01S 7/40 | (2006.01) | |
| G01S 7/41 | (2006.01) | |
| G01S 13/50 | (2006.01) | |

(52) U.S. Cl.
CPC .......... *G01S 13/588* (2013.01); *G01S 7/4095* (2021.05); *G01S 7/417* (2013.01); *G01S 13/505* (2013.01)

(58) Field of Classification Search
CPC ...... G01S 13/588; G01S 7/4095; G01S 7/417; G01S 13/505
See application file for complete search history.

(56) References Cited

U.S. PATENT DOCUMENTS

| | | | | |
|---|---|---|---|---|
| 3,790,939 A | * | 2/1974 | Constant | G01S 13/904 342/191 |
| 2023/0358879 A1 | * | 11/2023 | Muenzner | G06V 20/58 |

FOREIGN PATENT DOCUMENTS

DE 102020214123.1 * 5/2022

* cited by examiner

*Primary Examiner* — Timothy A Brainard
*Assistant Examiner* — Helena H Seraydaryan
(74) *Attorney, Agent, or Firm* — CANTOR COLBURN LLP

(57) ABSTRACT

A system includes a transmitter of a radar system to transmit transmitted signals, and a receiver of the radar system to receive received signals based on reflection of one or more of the transmitted signals by one or more objects. The system also includes a processor to train a neural network with reference data obtained by simulating a higher resolution radar system than the radar system to obtain a trained neural network. The trained neural network enhances detection of the one or more objects based on obtaining and processing the received signals in a vehicle. One or more operations of the vehicle are controlled based on the detection of the one or more objects.

20 Claims, 3 Drawing Sheets

HIGH RESOLUTION RADAR SIMULATION TO TRAIN VEHICLE RADAR SYSTEM NEURAL NETWORK

INTRODUCTION

The subject disclosure relates to a high resolution radar simulation to train a vehicle radar system neural network.

Vehicles (e.g., automobiles, motorcycles, construction equipment, farm equipment, automated factory equipment) include a number of sensors to provide information used to control aspects of its operation. Some sensors (e.g., inertial measurement unit, steering angle sensor) provide information about the vehicle while other sensors (e.g., radar system, lidar system, camera) provide information about objects around the vehicle. A radar system indicates range, angle, and relative velocity for objects within its field of view. Accordingly, it is desirable to provide a high resolution radar simulation to train a vehicle radar system neural network.

SUMMARY

In one exemplary embodiment, a system includes a transmitter of a radar system to transmit transmitted signals, and a receiver of the radar system to receive received signals based on reflection of one or more of the transmitted signals by one or more objects. The system also includes a processor to train a neural network with reference data obtained by simulating a higher resolution radar system than the radar system to obtain a trained neural network. The trained neural network enhances detection of the one or more objects based on obtaining and processing the received signals in a vehicle. One or more operations of the vehicle are controlled based on the detection of the one or more objects.

In addition to one or more of the features described herein, the processor simulates the higher resolution radar system to include more antennas or more closely spaced antennas that span a wider aperture than the radar system.

In addition to one or more of the features described herein, the processor simulates the higher resolution radar system to include more of the transmitted signals or more closely spaced transmitted signals than the radar system.

In addition to one or more of the features described herein, the processor simulates the higher resolution radar system to include a higher bandwidth than the radar system.

In addition to one or more of the features described herein, the processor trains the neural network by obtaining simulated received signals by using parameters of the radar system on reflection points and by obtaining simulated high resolution received signals by using high resolution parameters for the high resolution radar system.

In addition to one or more of the features described herein, the processor trains the neural network by obtaining the reflection points from a lidar system.

In addition to one or more of the features described herein, the processor trains the neural network by generating the reflection points.

In addition to one or more of the features described herein, the processor trains the neural network by processing the simulated received signals to obtain a data cube indicating an intensity at a first set of ranges, a first set of hypotheses of Doppler frequency, and a first set of angle hypotheses and by processing the simulated high resolution received signals to obtain a high resolution data cube indicating an intensity at a second set of ranges, a second set of hypotheses of Doppler frequency, and a second set of angle hypotheses, a number of the second set of ranges, the second set of hypotheses of Doppler frequency, and the second set of angle hypotheses being greater than a number of the first set of ranges, the first set of hypotheses of Doppler frequency, and the first set of angle hypotheses.

In addition to one or more of the features described herein, the processor trains the neural network by providing the data cube to the neural network and obtaining a neural network output.

In addition to one or more of the features described herein, the processor trains the neural network by obtaining a metric that indicates a match between the neural network output and the high resolution data cube and updating parameters of the neural network based on the metric.

In another exemplary embodiment, a non-transitory computer-readable medium stores instructions that, when processed by one or more processors, cause the one or more processors to implement a method. The method includes obtaining received signals resulting from reflection of one or more transmitted signals, transmitted by a transmitter of a radar system, by one or more objects and reception of the received signals by a receiver of the radar system. The method also includes training a neural network with reference data obtained by simulating a higher resolution radar system than the radar system to obtain a trained neural network. The trained neural network enhances detection of the one or more objects based on obtaining and processing the received signals in a vehicle. One or more operations of the vehicle are controlled based on the detection of the one or more objects.

In addition to one or more of the features described herein, the method also includes simulating the higher resolution radar system to include more antennas or more closely spaced antennas that span a wider aperture than the radar system.

In addition to one or more of the features described herein, the method also includes simulating the higher resolution radar system to include more of the transmitted signals or more closely spaced transmitted signals than the radar system.

In addition to one or more of the features described herein, the method also includes simulating the higher resolution radar system to include a higher bandwidth than the radar system.

In addition to one or more of the features described herein, the method also includes training the neural network by obtaining simulated received signals by using parameters of the radar system on reflection points and by obtaining simulated high resolution received signals by using high resolution parameters for the high resolution radar system.

In addition to one or more of the features described herein, the method also includes training the neural network by obtaining the reflection points from a lidar system.

In addition to one or more of the features described herein, the method also includes training the neural network by generating the reflection points.

In addition to one or more of the features described herein, the method also includes training the neural network by processing the simulated received signals to obtain a data cube indicating an intensity at a first set of ranges, a first set of hypotheses of Doppler frequency, and a first set of angle hypotheses and by processing the simulated high resolution received signals to obtain a high resolution data cube indicating an intensity at a second set of ranges, a second set of hypotheses of Doppler frequency, and a second set of angle hypotheses, a number of the second set of ranges, the second set of hypotheses of Doppler frequency, and the second set of angle hypotheses being greater than a number of the first set of ranges, the first set of hypotheses of Doppler frequency, and the first set of angle hypotheses.

In addition to one or more of the features described herein, the method also includes training the neural network by providing the data cube to the neural network and obtaining a neural network output.

In addition to one or more of the features described herein, the method also includes training the neural network by obtaining a metric that indicates a match between the neural network output and the high resolution data cube and updating parameters of the neural network based on the metric.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
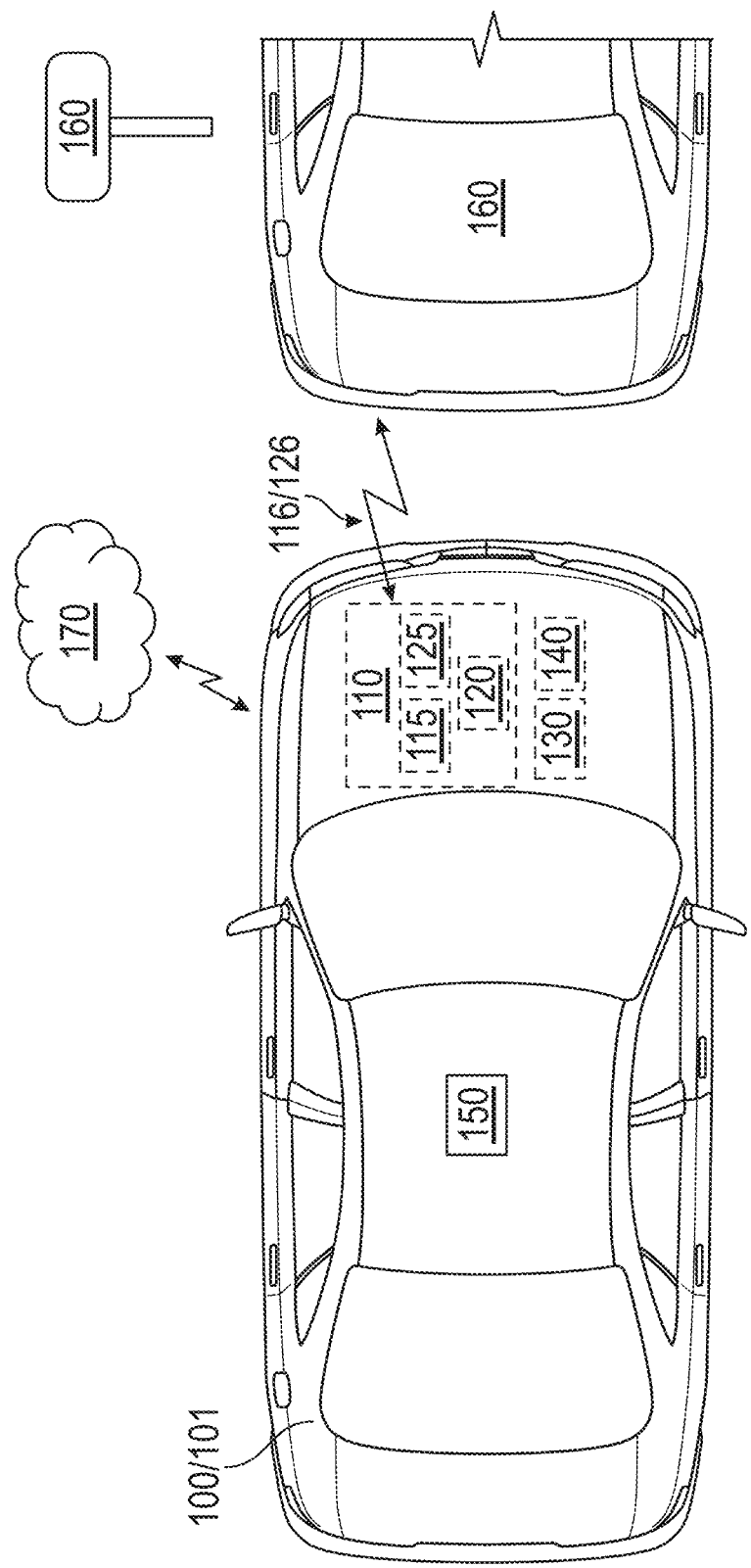
FIG. 1 is a block diagram of a vehicle that implements a radar system neural network trained using a high resolution radar simulation according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to a high resolution radar simulation to train a vehicle radar system neural network. As previously noted, a radar system may provide range and angle to one or more objects around a vehicle, as well as Doppler frequency, which indicates the relative velocity of the objects, relative to the vehicle. Generally, a radar system transmits energy, some of which is reflected by the one or more objects in its field of view. The reflected energy is processed, and object detection is performed to obtain the range, angle, and Doppler frequency.

Using a neural network on processed reflections can enhance object detection and increase the accuracy with which range, angle, and Doppler frequency are estimated. Discrimination between objects may also be improved. Training a neural network generally involves iteratively comparing a reference result with the neural network result to adjust parameters (e.g., weights) within the neural network. A prior approach to training a radar system neural network involves the use of processed data from other sensors (e.g., lidar system, camera) as the reference result. However, the data obtained with other types of sensors is not the same as the reflection intensity obtained by a radar system. In addition, the resolution of other types of sensors is generally much higher than the resolution of a radar system, resulting in a large gap between the reference result from these sensors and the neural network output based on radar data. These factors present challenges to properly training a radar system neural network with reference results from other types of sensors.

According to one or more embodiments, a high resolution radar system, with higher resolution hardware parameters than may be practicable for automotive radar systems, is simulated to obtain the reference results that are used to train the radar system neural network. That is, the higher resolution radar system is not physically fabricated but the higher resolution hardware parameters (e.g., number and arrangement of antennas, bandwidth, carrier frequency, pulse repetition interval) are used to generate synthetic reference results. Training of a radar system neural network using reference results from the simulated high resolution radar system results in improved performance over conventional training. Because the reference results are simulated, the resolution of the reference results (i.e., the resolution of the simulated high resolution radar system) may be increased gradually over the training period to improve training results. Continuous or on-line learning, referring to continuing training of the radar system neural network even after it is deployed and operational in a vehicle, may mitigate radar antenna variations or degradation over time.

In accordance with an exemplary embodiment, FIG. 1 is a block diagram of a vehicle 100 that implements a radar system neural network. The exemplary vehicle 100 shown in FIG. 1 is an automobile 101. The radar system neural network may be trained using a high resolution radar simulation according to one or more embodiments. The training may be performed off-line (i.e., outside the vehicle 100 prior to the radar system 110 being operational in the vehicle 100) or on-line (i.e., after the radar system 110 is deployed and operational in the vehicle 100).

The exemplary vehicle 100 is shown to include a radar system 110 with one or more transmitters 115 and one or more receivers 125. The transmitter 115 emits transmitted signals 116 and the receiver 125 receives reflections as a received signal 126 resulting from reflection of some of the radio frequency energy from the transmitted signals 116 by one or more objects 160. Exemplary objects 160 shown in FIG. 1 include a static object 160 (i.e., a sign) and a moving object 160 (i.e., another vehicle). The radar system 110 also includes a controller 120 that may implement the radar system neural network and may also implement training of the radar system neural network.

The vehicle 100 may include additional sensors such as a camera 140 and a lidar system 150. The numbers and locations of the radar system 110, camera 140, and lidar system 150 are not intended to limit the numbers and locations of the sensors in alternate embodiments. The vehicle 100 also includes a vehicle controller 130 that may control one or more operations of the vehicle 100 based on information from the sensors, such as the radar system 110. The controller 120 of the radar system 110 may communicate with the vehicle controller 130 and, directly or via the vehicle controller 130, also communicate with an external controller 170.

The controller 120 of the radar system 110, the vehicle controller 130, and the external controller 170 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The memory of the processing circuitry may include a non-transitory computer-readable medium that stores instructions which, when processed by one or more processors of the processing circuitry, implement the processes discussed herein. For example, the external controller 170 may implement off-line training of the radar system neural network and communicate the parameters of the radar system neural network to the controller 120 of the radar system 110 for use. The controller 120 of the radar system 110 may implement on-line training.

Figure 2:
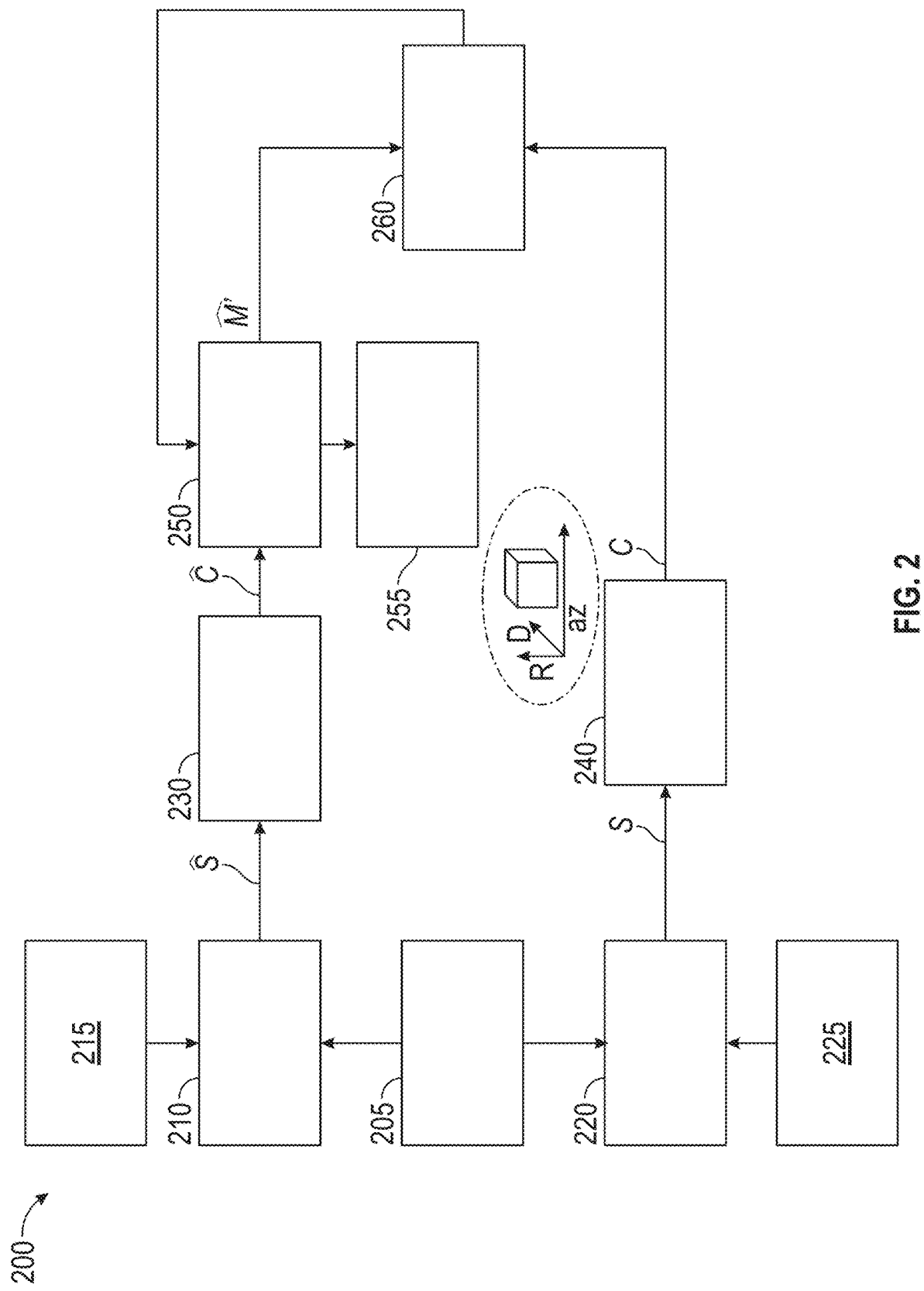
FIG. 2 is a process flow of a method of training a radar system neural network using a high resolution radar simulation according to one or more embodiments.

FIG. 2 is a process flow of a method 200 of training a radar system neural network using a high resolution radar simulation according to one or more embodiments. The processes may be implemented by the external controller 170 as off-line training of the radar system neural network. Additionally or alternately, the processes may be performed by the controller 120 of the radar system 110 or the vehicle controller 130. During the training, both the high resolution radar and the radar system 110 are simulated. That is, radar parameters 215, 225 for both the radar system 110 and for a hypothetical high resolution radar system may be simulated in order to train the radar system neural network, as detailed.

At block 205, generating reflections may be from a real or simulated scene according to alternate approaches. According to an exemplary embodiment, the lidar system 150 may obtain reflection points from a real-world scene. According to an alternate embodiment, a scene may be simulated and reflection points may be obtained from the simulated scene. In either case, the resulting reflection points mimic the energy that would result from reflection of transmitted signals 116 by one or more objects 160.

At block 210, obtaining a received signal § at the radar system 110 is based on radar parameters 215 of the radar system 110. The result simulates the output of the receiver 125 of the radar system 110 under real-world operational conditions. At block 220, obtaining a received signal S at the high resolution radar simulation is based on high resolution radar parameters 225. As previously noted, the resolution of the high resolution radar simulation may be increased over the course of the training. That is, the high resolution radar parameters 225 may be changed (e.g., improved) over the course of the training.

Values of the radar parameters 215 of the radar system 110 that are simulated during the training process may be those of the physical radar system 110. Exemplary radar parameters include the number of antennas and their positions. In this regard, the high resolution radar parameters 225 may facilitate higher angular resolution by simulating a greater number of antennas that span a wider aperture. Another exemplary radar parameter includes bandwidth. Bandwidth refers to the range of frequencies transmitted in the transmitted signals 116. For example, each of the transmitted signals 116 may be a linear frequency modulated continuous wave (i.e., chirp) with a frequency increasing linearly from 77 to 78 gigahertz (GHz). In this case, the bandwidth would be 1 GHz. The high resolution radar parameters 225 may include a higher bandwidth and even a bandwidth that is not physically feasible. As such, the high resolution radar parameters 225 may facilitate higher range resolution. Yet another exemplary radar parameter includes pulse repetition interval (PRI), which defines how close one chirp is to the next chirp among the transmitted signals 116. The high resolution radar parameters 225 may include a smaller PRI (or higher carrier frequency or higher number of chirps) and may facilitate higher Doppler resolution.

At block 230, performing processing on the received signal § (i.e., the simulated output of the receiver 125 of the radar system 110 obtained at block 210) involves the same processes performed on the received signal S obtained (at block 220) using the high resolution radar parameters 225. However, based on the difference between the radar parameters 215 of the radar system 110 and the high resolution radar parameters 225 of the high resolution radar simulation and the resulting difference between the received signals S and S that are input at blocks 230 and 240, respectively, the result of the processing at blocks 230 and 240 differs.

The signal processing performed at blocks 230 and 240 is known and briefly described herein. A fast Fourier transform (FFT) is performed across a set of range intervals, referred to as range bins R, for each transmitted signal 116. The range bins R may span the detection range of the radar system 110 at regular intervals, for example. This results in a range map that indicates the energy level for each range bin R and each transmitted signal 116. The number of range bins R may be higher at block 240 (for the simulated high resolution radar), as compared with the processing at block 230, such that the range resolution is higher based on the simulated high resolution radar.

A second FFT is then performed across Doppler frequencies, referred to as Doppler hypotheses D that pertain to potential relative velocities of one or more objects 160 that gave rise to the received signals 126. The simulated high resolution radar system may have a higher number of Doppler hypotheses D (i.e., higher Doppler resolution) according to the processing at block 240 as compared with the processing at block 230. For each range bin R, the range map result over the set of transmitted signals 116 is combined. This second FFT results in a range-Doppler map indicating energy level over the range bins R and Doppler hypotheses D.

In a process referred to as beamforming, a set of azimuth hypotheses az is then considered. Each azimuth hypothesis az is an azimuth angle relative to the radar system 110 from which one or more reflection points may have originated. The number of azimuth hypotheses az may be higher at block 240 as compared with block 230 such that the angle resolution is higher for the simulated high resolution radar system. This results in a data cube $\hat{C}$ (from block 230) and a data cube C (from block 240) indicating energy level for each of a set of range bins R, Doppler hypotheses D, and azimuth hypotheses az, as indicated. To be clear, the size of the data cube if $\hat{C}$ (from block 230) and the size of the data cube C (from block 240) may differ based on the different number of range bins R, Doppler hypotheses D, and azimuth hypotheses az. Generally, object detection in a radar system 110 based on the result of signal processing refers to identifying the range bin R, Doppler hypothesis D, and azimuth hypothesis az associated with energy levels that exceed a threshold value, for example.

According to one or more embodiments, prior to detection, the data cube $\hat{C}$ (from block 230) is enhanced by using the radar system neural network, at block 250. The result is the enhanced data map $\hat{M}$. The operation of the radar system neural network (at block 250) is further discussed with reference to FIG. 3. At block 260, computing a loss refers to checking the radar system neural network result (from block 250) against the result obtained (at block 240) from the simulated high resolution radar system and obtaining a metric that reflects a match between the two results. Specifically, the energy level (i.e., intensity) at each range bin R and azimuth hypothesis az indicated by the enhanced data map $\hat{M}'$ is compared with the reference energy level (i.e., intensity) at each range bin R and azimuth hypothesis az indicated by the data cube C. While loss may be computed in a number of ways at block 260, an exemplary loss computation is detailed.

At block 260, the loss may be determined based on determining, for each range bin R and azimuth hypothesis az of the enhanced data map $\hat{M}'$ and the data cube C, a probability that the intensity level indicates a detection and a probability that the intensity level does not indicate a detection. To make the processing more efficient, for each range bin R and azimuth hypothesis az pair of the data cube C, only the Doppler hypothesis D associated with the highest intensity may be used. Then, for each range bin R and azimuth hypothesis az pair, $p_0$ indicates the probability that the intensity level indicates a detection of an object 160, and $p_1$ indicates the probability that the intensity level does not indicate a detection of an object 160.

In addition, in the enhanced data map $\hat{M}'$, Doppler cells are compressed as part of the processing at block 250, as discussed with reference to FIG. 3. Then, for each combination of range bin R and azimuth hypothesis az, $\hat{p}_0$ indicates the probability that the intensity level indicates a detection of an object 160, and $\hat{p}_1$ indicates the probability that the intensity level does not indicate a detection of an object 160. The cross-entropy loss may then be computed as:

$$\text{loss} = -p_0 \log(\hat{p}_0) - p_1 \log(\hat{p}_1) \qquad [\text{EQ. 1}]$$

A low value of the loss computed according to EQ. 1 indicates a higher match between the enhanced data map $\hat{M}'$ output by the radar system neural network and the data cube C output by the high resolution radar simulation than a high value of the loss.

As indicated in FIG. 2, the loss value is provided to block 250 for updating the radar system neural network parameters. The radar system neural network may be deemed ready for deployment (at block 255) in a vehicle 100 based on the computed loss (at block 260) being below a threshold, for example. After deployment, the parameters of the radar system neural network may be updated or continuously trained using the processes show in FIG. 2.

Figure 3:
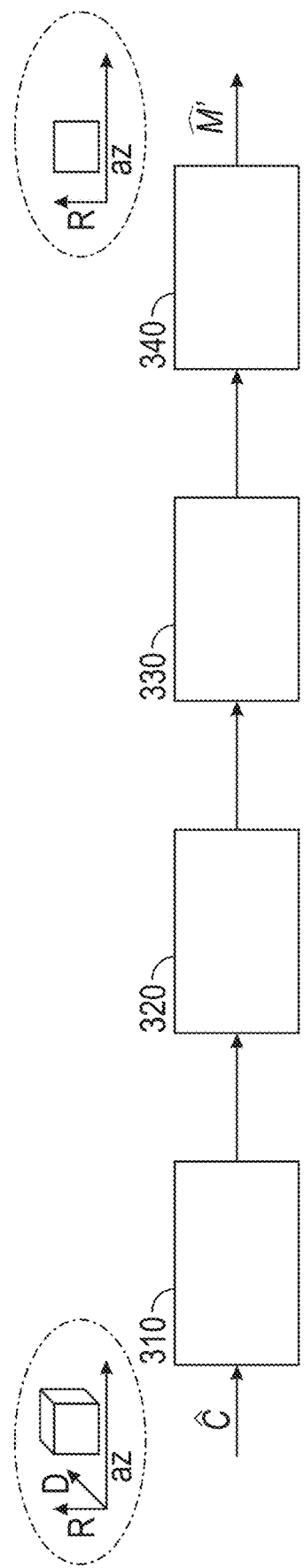
FIG. 3 shows processes implemented by the radar system neural network according to one or more embodiments.

FIG. 3 shows processes that are implemented at block 250 by the radar system neural network according to an exemplary embodiment. As also shown in FIG. 2, the data cube $\hat{C}$ (from block 230) is input to the radar system neural network. The radar system neural network may be a deep neural network (i.e., includes more than three layers including the input and output layers). At block 310, the data cube $\hat{C}$ may be reduced in the Doppler dimension. This may be done in several different ways. For example, for the multiple (e.g., 256) Doppler hypotheses D associated with each range bin R and azimuth hypothesis az, only the Doppler hypothesis D with the highest intensity and a specified number of the Doppler hypotheses D around the Doppler hypothesis D with the highest intensity may be retained. Alternately, only a specified number (e.g., 3) of the Doppler hypotheses D associated with the highest intensities may be retained. The result is a reduced number of Doppler hypotheses D as compared with the data cube $\hat{C}$.

At block 320, the processes include implementing a two-dimensional convolutional neural network (CNN). According to an alternate embodiment for the processing architecture of the radar system neural network, a self-attention architecture may be used that involves calculating key query and value features from the input data cube $\hat{C}$ (from block 230). The combination of the value features may be weighted based on the correlation between the key and query features. At block 330, increasing the azimuth resolution includes, for example, implementing a transpose convolution operation. At block 340, detection and Doppler regression results in the enhanced data map $\hat{M}'$. Detection refers to the probability $p_0$ that the reflection intensity level exceeds a detection threshold and indicates a detection of an object 160. This detection is per combination of range bin R and azimuth hypothesis az. Doppler regression refers to the estimated Doppler frequency at each combination of range bin R and azimuth hypothesis az associated with a detection. This estimated Doppler frequency may be the maximal Doppler in each combination of range bin R and azimuth hypothesis az associated with a detection. The estimated Doppler frequency may instead by obtained with another trained neural network. As illustrated in FIG. 3, the enhanced data map $\hat{M}'$ indicates the radar reflection intensity for each combination of range bin R and azimuth hypothesis az. The result may also include the estimated Doppler frequency of each range bin R and azimuth hypothesis az combination.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. Unless defined otherwise, technical and scientific terms used herein have the same meaning as is commonly understood by one of skill in the art to which this disclosure belongs.

What is claimed is:

1. A system comprising:
    a transmitter of a radar system configured to transmit transmitted signals;
    a receiver of the radar system configured to receive received signals based on reflection of one or more of the transmitted signals by one or more objects; and
    a processor configured to:
        obtain simulated received signals by using parameters of the radar system on reflection points;
        obtain simulated high resolution received signals by using high resolution parameters for the high resolution radar system, the simulated high resolution received signals obtained by simulating a higher resolution radar system than the radar system; and
        train a neural network by:
            processing the simulated received signals to obtain a data cube indicating an intensity at a first set of ranges, a first set of hypotheses of Doppler frequency, and a first set of angle hypotheses; and
            processing the simulated high resolution received signals to obtain a high resolution data cube indicating an intensity at a second set of ranges, a second set of hypotheses of Doppler frequency, and a second set of angle hypotheses, a number of the second set of ranges, the second set of hypotheses of Doppler frequency, and the second set of angle hypotheses being greater than a number of the first set of ranges, the first set of hypotheses of Doppler frequency, and the first set of angle hypotheses;

wherein the trained neural network enhances detection of the one or more objects based on obtaining and processing the received signals in a vehicle and one or more operations of the vehicle are controlled based on the detection of the one or more objects.

2. The system according to claim 1, wherein the processor is configured to simulate the higher resolution radar system to include more antennas or more closely spaced antennas that span a wider aperture than the radar system.

3. The system according to claim 1, wherein the processor is configured to simulate the higher resolution radar system to include more of the transmitted signals or more closely spaced transmitted signals than the radar system.

4. The system according to claim 1, wherein the processor is configured to simulate the higher resolution radar system to include a higher bandwidth than the radar system.

5. The system according to claim 1, wherein the processor is configured to train the neural network by obtaining the reflection points from a lidar system.

6. The system according to claim 1, wherein the processor is configured to train the neural network by generating the reflection points.

7. The system according to claim 1, wherein the processor is configured to train the neural network by providing the data cube to the neural network and obtaining a neural network output.

8. The system according to claim 7, wherein the processor is configured to train the neural network by obtaining a metric that indicates a match between the neural network output and the high resolution data cube and updating parameters of the neural network based on the metric.

9. The system of claim 1, wherein the transmitted signals are linear frequency modulated continuous wave signals.

10. The system of claim 1, wherein the neural network is a convolutional neural network.

11. A non-transitory computer-readable medium configured to store instructions that, when processed by one or more processors, cause the one or more processors to implement a method, the method comprising:

obtaining received signals resulting from reflection of one or more transmitted signals, transmitted by a transmitter of a radar system, by one or more objects and reception of the received signals by a receiver of the radar system; and obtaining simulated received signals by using parameters of the radar system on reflection points;

obtaining simulated high resolution received signals by using high resolution parameters for a high resolution radar system that simulates a higher resolution radar system than the radar system; and training the neural network by:
processing the simulated received signals to obtain a data cube indicating an intensity at a first set of ranges, a first set of hypotheses of Doppler frequency, and a first set of angle hypotheses; and processing the simulated high resolution received signals to obtain a high resolution data cube indicating an intensity at a second set of ranges, a second set of hypotheses of Doppler frequency, and a second set of angle hypotheses, a number of the second set of ranges, the second set of hypotheses of Doppler frequency, and the second set of angle hypotheses being greater than a number of the first set of ranges, the first set of hypotheses of Doppler frequency, and the first set of angle hypotheses;

wherein the trained neural network enhances detection of the one or more objects based on obtaining and processing the received signals in a vehicle and one or more operations of the vehicle are controlled based on the detection of the one or more objects.

12. The non-transitory computer-readable medium according to claim 11, wherein the method also includes simulating the higher resolution radar system to include more antennas or more closely spaced antennas that span a wider aperture than the radar system.

13. The non-transitory computer-readable medium according to claim 11, wherein the method also includes simulating the higher resolution radar system to include more of the transmitted signals or more closely spaced transmitted signals than the radar system.

14. The non-transitory computer-readable medium according to claim 11, wherein the method also includes simulating the higher resolution radar system to include a higher bandwidth than the radar system.

15. The non-transitory computer-readable medium according to claim 11, wherein the method also includes training the neural network by obtaining the reflection points from a lidar system.

16. The non-transitory computer-readable medium according to claim 11, wherein the method also includes training the neural network by generating the reflection points.

17. The non-transitory computer-readable medium according to claim 11, wherein the method also includes training the neural network by providing the data cube to the neural network and obtaining a neural network output.

18. The non-transitory computer-readable medium according to claim 17, wherein the method also includes training the neural network by obtaining a metric that indicates a match between the neural network output and the high resolution data cube and updating parameters of the neural network based on the metric.

19. The non-transitory computer-readable medium of claim 11, wherein the transmitted signals are linear frequency modulated continuous wave signals.

20. The non-transitory computer-readable medium of claim 11, wherein the neural network is a convolutional neural network.

* * * * *